(12) United States Patent
Awa et al.

(10) Patent No.: US 8,187,510 B2
(45) Date of Patent: May 29, 2012

(54) METHOD FOR PRODUCING GRANULAR COMPOSITION

(75) Inventors: Hideaki Awa, Osaka (JP); Masato Arai, Osaka (JP); Hajime Shinomiya, Oita (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 203 days.

(21) Appl. No.: 12/662,122

(22) Filed: Mar. 31, 2010

(65) Prior Publication Data

US 2010/0256267 A1   Oct. 7, 2010

(30) Foreign Application Priority Data

Apr. 3, 2009   (JP) .................................. 2009-090830

(51) Int. Cl.
*B29B 9/08* (2006.01)
(52) U.S. Cl. ........ 264/117; 264/118; 264/140; 252/397; 252/404
(58) Field of Classification Search .................. None
See application file for complete search history.

(56) References Cited

U.S. PATENT DOCUMENTS 5,240,642 A * 8/1993 Neri et al. ..................... 252/399
7,425,290 B2 * 9/2008 Semen ........................... 264/109

(Continued)

FOREIGN PATENT DOCUMENTS

EP   0 514 784   11/1992

(Continued)

OTHER PUBLICATIONS

European Search Report issued Jul. 27, 2010 in corresponding European Patent Application No. 10159018.0.

(Continued)

*Primary Examiner* — Mary F Theisen
(74) *Attorney, Agent, or Firm* — Wenderoth, Lind & Ponack, L.L.P.

(57) ABSTRACT

A method for producing a granular composition including the steps of: stirring and granulating a mixture containing not less than 3 parts by weight and not more than 80 parts by weight of a phenol compound represented by the formula (1):

$$\left( HO - \underset{R_1}{\underset{|}{\bigcirc}} - C_2H_4 - \overset{O}{\underset{\|}{C}} - \right)_n X \quad (1)$$

wherein $R_1$ is an alkyl group having 1 to 8 carbon atoms, X is an n-valent alcohol residue having 1 to 18 carbon atoms optionally containing a heteroatom, a cyclic group, or a heteroatom and a cyclic group, and n is an integer of 1 to 4, and not less than 20 parts by weight and not more than 50 parts by weight of a binder to obtain a granular agglomerate; and cracking the granular agglomerate at a temperature equal to or lower than the melting point of the binder and equal to or higher than the temperature which is 10° C. lower than the melting point, through a cracking machine equipped with a separation mechanism capable of recovering a granule having a particle size of not more than 5 mm, and a cracking mechanism, to obtain a granule.

7 Claims, 1 Drawing Sheet

U.S. PATENT DOCUMENTS

| | | | |
|---|---|---|---|
| 7,732,518 B2 * | 6/2010 | Awa et al. | 524/394 |
| 2003/0125432 A1 * | 7/2003 | Yukino et al. | 524/136 |
| 2007/0100045 A1 * | 5/2007 | Kimura et al. | 524/291 |

FOREIGN PATENT DOCUMENTS

| | | |
|---|---|---|
| EP | 1 266 932 | 12/2002 |
| EP | 1 780 236 | 5/2007 |
| EP | 1 985 653 | 10/2008 |
| JP | 2007-161997 | 6/2007 |
| WO | 00/32687 | 6/2000 |

OTHER PUBLICATIONS

Singapore Search Report and Written Opinion issued Aug. 19, 2011 in counterpart Singapore Application No. 201002322-4.

* cited by examiner

METHOD FOR PRODUCING GRANULAR COMPOSITION

BACKGROUND OF THE INVENTION

1. Field of the Invention

The present application is filed, claiming the Paris Convention priorities of Japanese Patent Application No. 2009-90830 (filed on Apr. 3, 2009), the entire content of which is incorporated herein by reference.

The present invention relates to a method for producing a granular composition.

2. Description of the Related Art

In order to prevent thermal degradation and oxidation degradation, resins such as polyolefins are admixed with a composition for imparting anti-oxidant properties containing a phenol compound for imparting anti-oxidant properties. Such compositions for imparting anti-oxidant properties are generally powder compositions, and therefore, a problem of dust scattering often arises, granular compositions have been proposed instead of the powder compositions.

Hitherto, as a method for producing a granular composition for imparting anti-oxidant properties, for example, a method for producing a granule cluster as disclosed in JP-A-2007-161997 has been proposed (see JP-A-2007-161997).

SUMMARY OF THE INVENTION

When the granular composition for imparting anti-oxidant properties is produced by a stirring granulation method, however, a granular agglomerate in which granules adhere to each other may sometimes be produced, and it is not easy to obtain a desired granule.

Under such a circumstance, as a result of studies, the present inventors have reached the present invention.

That is, the present invention provides the following [1] to [7].

[1] A method for producing a granular composition including the steps of:

stirring and granulating a mixture containing not less than 3 parts by weight and not more than 80 parts by weight of a phenol compound represented by the formula (1):

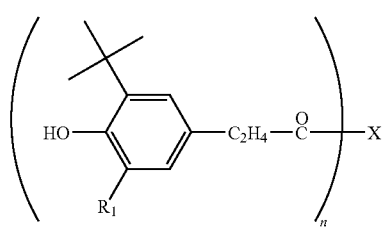

(1)

wherein $R_1$ is an alkyl group having 1 to 8 carbon atoms, X is an n-valent alcohol residue having 1 to 18 carbon atoms optionally containing a heteroatom, a cyclic group, or a heteroatom and a cyclic group, and n is an integer of 1 to 4, and not less than 20 parts by weight and not more than 50 parts by weight of a binder to obtain a granular agglomerate; and cracking the granular agglomerate at a temperature equal to or lower than the melting point of the binder and equal to or higher than the temperature which is 10° C. lower than the melting point, through a cracking machine equipped with a separation mechanism capable of recovering a granule having a particle size of not more than 5 mm, and a cracking mechanism, to obtain a granule.

[2] The method according to [1], wherein the binder has a melting point of not lower than 40° C. and not higher than 90° C.

[3] The method according to [1] or [2], wherein the separation mechanism is a screen having an opening.

[4] The method according to any one of [1] to [3], wherein the cracking mechanism is a contact-type shearing mechanism capable of cracking the granular agglomerate into the granule through a reciprocating or revolving plate.

[5] The method according to any one of [1] to [4], wherein the phenol compound is at least one compound selected from the group consisting of 3,9-bis[2-{3-(3-t-butyl-4-hydroxy-5-methylphenyl)propionyloxy}-1,1-dimethylethyl]-2,4,8,10-tetraoxaspiro[5.5]undecane, pentaerythrityl tetrakis[3-(3,5-di-t-butyl-4-hydroxyphenyl)propionate], and triethylene glycolyl bis{3-(3-t-butyl-4-hydroxy-5-methylphenyl)propionate}.

[6] The method according to any one of [1] to [5], wherein the binder is a sulfur compound represented by the formula (2):

$$(R_2-Y-S-C_2H_4CO)_m-Z \quad (2)$$

wherein $R_2$ is an alkyl group having 12 to 18 carbon atoms, Y is a single bond or $-C_2H_4CO_2-$, m is an integer of 1 to 4, and Z is an m-valent alcohol residue having 5 to 18 carbon atoms.

[7] The method according to any one of [1] to [6], wherein the binder is at least one compound selected from the group consisting of di-n-dodecyl 3,3'-thiodipropionate, di-n-tetradecyl 3,3'-thiodipropionate, and di-n-octadecyl 3,3'-thiodipropionate.

BRIEF DESCRIPTION OF THE SYMBOLS

Figure 1:
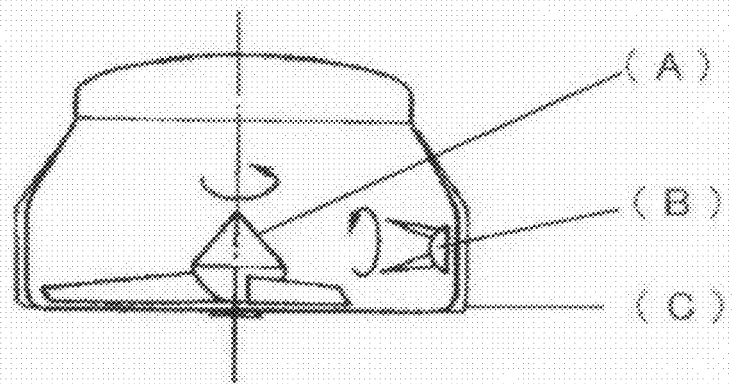
FIG. 1 is a schematic view of a stirring granulator used in examples and comparative examples.

A: Stirring blade
B: Chopper
C: Jacket
D: Rotor
E: Screen

DETAILED DESCRIPTION OF THE INVENTION

The present invention relates to a method for producing a granular composition for imparting anti-oxidant properties, which contains a phenol compound capable of imparting anti-oxidant properties and a binder, in which the phenol compound is a phenol compound represented by the formula (1):

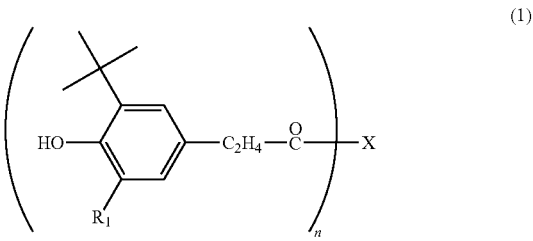

(1)

wherein $R_1$ is an alkyl group having 1 to 8 carbon atoms, X is an n-valent alcohol residue having 1 to 18 carbon atoms optionally containing a heteroatom, a cyclic group, or a heteroatom and a cyclic group, and n is an integer of 1 to 4, the method comprising the steps of: stirring and granulating a mixture containing not less than 3 parts by weight and not more than 80 parts by weight of the phenol compound and not less than 20 parts by weight and not more than 50 parts by weight of the binder to obtain a granular agglomerate; and cracking the granular agglomerate at a temperature equal to or lower than the melting point of the binder and equal to or higher than the temperature which is 10° C. lower than the melting point, through a cracking machine equipped with a separation mechanism capable of recovering a granule having a particle size of not more than 5 mm, and a cracking mechanism, to obtain a granule.

The phenol compound is the phenol compound represented by the formula (1).

In the formula (1), $R_1$ is an alkyl group having 1 to 8 carbon atoms. Examples of the alkyl group having 1 to 8 carbon atoms include a methyl group, an ethyl group, an i-propyl group, a t-butyl group, a t-pentyl group, and a t-octyl group. A methyl group and a t-butyl group may be preferably exemplified.

In the formula (1), X is an n-valent alcohol residue having 1 to 18 carbon atoms, which may contain a heteroatom and/or a cyclic group. Examples of the n-valent alcohol residue having 1 to 18 carbon atoms, which may contain a heteroatom and/or a cyclic group, include a residue of triethylene glycol, a residue of pentaerythritol, and a residue of 3,9-bis(1,1-dimethyl-2-hydroxyethyl)-2,4,8,10-tetraoxaspiro[5.5]undecane. A residue of pentaerythritol and a residue of 3,9-bis(1,1-dimethyl-2-hydroxyethyl)-2,4,8,10-tetraoxaspiro[5.5]undecane may be preferably exemplified. As used herein, the "alcohol residue" refers to a group in which H is removed from OH of the alcohol.

In the formula (1), n is an integer of 1 to 4, preferably 2 or 4.

Specific examples of the phenol compound include 3,9-bis[2-{3-(3-t-butyl-4-hydroxy-5-methylphenyl)propionyloxy}-1,1-dimethylethyl]-2,4,8,10-tetraoxaspiro[5.5]undecane (melting point: 110 to 130° C.), pentaerythrityl tetrakis[3-(3,5-di-t-butyl-4-hydroxyphenyl)propionate] (melting point: 110 to 130° C.), and triethylene glycolyl bis{3-(3-t-butyl-4-hydroxy-5-methylphenyl)propionate} (melting point: 76 to 79° C.)

Examples of the binder include compounds having a melting point of not lower than 40° C. and not higher than 90° C., preferably not lower than 40° C. and not higher than 60° C. As used herein, the "melting point" refers to a temperature measured in accordance with JIS K 0064.

Examples of the typical binder include partial fatty acid esters of polyhydric alcohols, fatty acid amides, and sulfur compounds represented by the formula (2):

$$(R_2-Y-S-C_2H_4CO)_m-Z \quad (2)$$

wherein $R_2$ is an alkyl group having 12 to 18 carbon atoms, Y is a single bond or $-C_2H_4CO_2-$, m is an integer of 1 to 4, and Z is an m-valent alcohol residue having 5 to 18 carbon atoms. The sulfur compounds represented by the formula (2) are preferably used.

In the formula (2), $R_2$ is an alkyl group having 12 to 18 carbon atoms. Examples of the alkyl group having 12 to 18 carbon atoms include a lauryl group, a myristyl group, a palmityl group, and a stearyl group; a lauryl group, a myristyl group and a stearyl group may be preferably exemplified.

In the formula (2), Y is a single bond or $-C_2H_4CO_2-$.

In the formula (2), Z is an m-valent alcohol residue having 5 to 18 carbon atoms. The term "alcohol residue" refers to a group in which H is removed from OH of the alcohol.

Examples of the m-valent alcohol residue having 5 to carbon atoms include a lauryl alcohol residue, a myristyl alcohol residue, a palmityl alcohol residue, a stearyl alcohol residue, and a pentaerythrityl alcohol residue; a lauryl alcohol residue, a myristyl alcohol residue, a stearyl alcohol residue, and a pentaerythrityl alcohol residue may be preferably exemplified.

Examples of the binder include di-n-dodecyl 3,3'-thiodipropionate (melting point: 40 to 42° C.), di-n-tetradecyl 3,3'-thiodipropionate (melting point: 49 to 54° C.), di-n-octadecyl 3,3'-thiodipropionate (melting point: 65 to 67° C.), and pentaerythrityl tetrakis(3-dodecylthiopropionate) (melting point: about 46° C.)

When a granular composition is produced according to the production method of the present invention, first, a mixture containing not less than 3 parts by weight and not more than 80 parts by weight of the phenol compound and not less than 20 parts by weight and not more than 50 parts by weight of the binder is stirred and granulated. Preferably, a mixture containing not less than 3 parts by weight and not more than 50 parts by weight of the phenol compound and not less than 20 parts by weight and not more than 50 parts by weight of the binder, more preferably, a mixture containing not less than 3 parts by weight and not more than 50 parts by weight of the phenol compound and not less than 20 parts by weight and not more than 30 parts by weight of the binder, is stirred and granulated.

The mixing ratio of the phenol compound and the binder, contained in the mixture, is usually from 4:1 to 1:5, preferably from 2:1 to 1:4.

The mixture may contain at least one additive selected from a neutralizing agent, a phosphorus compound for imparting anti-oxidant properties, a hindered amine light stabilizer, an ultraviolet absorber, a metal soap, an antistatic agent, an anti-blocking agent, a pigment, a flame-retardant, a filler, a nucleating agent, a lubricant, a plasticizer, a processing aid, a foaming agent, an emulsifier, a gloss agent and a phenol compound for imparting anti-oxidant properties other than the phenol compound of the invention, so long as the effects of the invention are exhibited.

The amount of the additives used is preferably from 3 to 77% by weight, more preferably from 10 to 70% by weight, further preferably from 25 to 65% by weight, based on the total weight of the mixture containing the phenol compound and the binder.

Typical examples of the additives are shown in the following.

<Neutralizing Agent>

Neutralizing agents such as synthetic hydrotalcite, natural hydrotalcite and calcium hydroxide.

<Phosphorus Compound for Imparting Anti-Oxidant Properties>

Phosphorus anti-oxidants such as tris(2,4-di-t-butylphenyl)phosphite (melting point: 183 to 187° C.), bis(2,4-di-t-butylphenyl)pentaerythritol diphosphite (melting point: 160 to 180° C.), bis(2,6-di-t-butyl-4-methylphenyl)pentaerythritol diphosphite (melting point: 237 to 238° C.), bis(2,4-dicumylphenyl)pentaerythritol diphosphite (melting point: 221 to 230° C.), tetrakis(2,4-di-t-butylphenyl)-4,4'-biphenylene diphosphonite (melting point: 75° C.), 6-[3-(3-t-butyl-4-hydroxy-5-methylphenyl)propoxy]-2,4,8,10-tetra-t-butyldibenz[d,f][1,3,2]dioxaphosphepin (melting point: 115° C.), bis(2,4-di-cumylphenyl)pentaerythritol diphosphite, tetrakis(2,4-di-t-butylphenyl)-4,4'-biphenylene diphosphonite (melting point: 75 to 90° C.), and bis[2,4-di-t-butyl(6-methyl)phenyl]ethyl phosphite (melting point: 89 to 92° C.)

<Hindered Amine Light Stabilizer>

Hindered amine light stabilizers such as bis(2,2,6,6-tetramethyl-4-piperidyl)sebacate (melting point: 81 to 86° C.), bis(2,2,6,6-tetramethyl-4-piperidyl)ester, 2,2,6,6-tetramethyl-4-piperidyl methacrylate (melting point: 58° C.), and poly[{6-(1,1,3,3-tetramethylbutyl)amino-1,3,5-triazine-2,4-diyl}{(2,2,6,6-tetramethyl-4-piperidyl)imino}-1,6-hexamethylene{(2,2,6,6-tetramethyl-4-piperidyl)imino}] (melting point: 100 to 135° C.)

<Ultraviolet Absorber>

Ultraviolet absorbers such as 2-hydroxy-4-n-octyloxy benzophenone (melting point: not lower than 45° C.), 2-(2H-benzotriazol-2-yl)-4,6-di-t-pentyl phenol (melting point: not lower than 77° C.), 2-[4,6-bis(2,4-dimethylphenyl)-1,3,5-triazine-2-yl]-5-(octyloxy)phenol (melting point: 87 to 89° C.), 2-(2-hydroxy-5-methylphenyl)benzotriazole (melting point: 127° C.), 2-(3-t-butyl-2-hydroxy-5-methylphenyl)-5-chlorobenzotriazole (melting point: 137° C.), and 2,4-di-t-butylphenyl 3,5-di-t-butyl-4-hydroxybenzoate (melting point: 192° C.)

<Metal Soap>

Metal soaps such as fatty acid metal salts, e.g., calcium stearate.

<Antistatic Agent>

Antistatic agents including quaternary ammonium salt type cationic surfactants, betaine type ampholytic surfactants, alkyl phosphate type anionic surfactants, and cationic surfactants such as primary amine salts, secondary amine salts, tertiary amine salts, quaternary amine salts and pyridine derivates;

anionic surfactants such as sulfated oils, soaps, sulfated ester oils, sulfated amide oils, sulfated ester salts of olefins, fatty alcohol sulfate ester salts, alkyl sulfate ester salts, fatty acid ethyl sulfonates, alkylnaphthalene sulfonates, alkylbenzene sulfonates, succinic acid ester sulfonates, and phosphate salts;

nonionic surfactants such as ethylene oxide adducts with a partial fatty acid ester of a polyhydric alcohol, ethylene oxide adducts with a fatty alcohol, ethylene oxide adducts with a fatty acid, ethylene oxide adducts with a fatty amino or a fatty acid amide, ethylene oxide adducts with an alkyl phenol, ethylene oxide adducts with a partial fatty acid ester of a polyhydric alcohol, and polyethylene glycol; and ampholytic surfactants such as carboxylic acid derivatives and imidazoline derivatives.

<Anti-Blocking Agent>

Inorganic anti-blocking agents such as aluminum silicate, synthetic silica, natural silica, zeolite, kaolin and diatomaceous earth; and organic anti-blocking agents such as crosslinked polymethyl methacrylate.

<Pigment>

Pigments such as carbon black, titanium oxide, phthalocyanine pigments, quinacridone pigments, isoindolinone pigments, perylene or perynine pigments, quinophthalone pigments, diketopyrrolo-pyrrole pigments, dioxazine pigments, fused disazo pigments, and benzimidazolone pigments.

<Flame-Retardant>

Flame-retardants such as decabromobiphenyl, antimony trioxide, phosphorus flame-retardants, and aluminum hydroxide.

<Filler>

Fillers such as calcium carbonate, silicates, glass fibers, talc, kaolin, mica, barium sulfate, carbon black, carbon fibers, zeolite, metal powders, and metal oxides.

<Nucleating Agent>

Nucleating agents such as an Na salt of α-naphthalene sulfonic acid, an Mg salt of α-naphthalene sulfonic acid, a Ca salt of α-naphthalene sulfonic acid, an Al salt of α-naphthalene sulfonic acid, an Na salt of 8-aminonaphthalene sulfonic acid, an Na salt of benzenesulfonic acid, an Mg salt of benzenesulfonic acid, a Ca salt of benzenesulfonic acid, an Al salt of benzenesulfonic acid, a Ca salt of 2,5-dichlorobenzenesulfonic acid, an Mg salt of 2,5-dichlorobenzenesulfonic acid, a Ca salt of m-xylenesulfonic acid, an Mg salt of m-xylenesulfonic acid, benzoic acid (melting point: 122° C.), p-isopropyl benzoic acid, o-t-butyl benzoic acid, p-t-butylbenzoic acid, monophenylacetic acid (melting point: 77° C.), diphenylacetic acid, an Li salt, Al salt or Na salt of diphenylacetic acid, an Na salt of diphenylacetic acid, an Mg salt of diphenylacetic acid, a Ca salt of diphenylacetic acid, a Ba salt of diphenylacetic acid, an Al salt of diphenylacetic acid, phenyldimethylacetic acid, an Li salt of phenyldimethylacetic acid, an Na salt of phenyldimethylacetic acid, an Mg salt of phenyldimethylacetic acid, a Ca salt of phenyldimethylacetic acid, a Ba salt of phenyldimethylacetic acid, an Mg salt of phthalic acid, succinic acid (melting point: 185° C.), an Li salt of succinic acid, an Na salt of succinic acid, an Mg salt of succinic acid, a Ca salt of succinic acid, a Ba salt of succinic acid, glutaric acid (melting point: 95 to 99° C.), an Li salt of glutaric acid, an Na salt of glutaric acid, an Mg salt of glutaric acid, a Ca salt of glutaric acid, a Ba salt of glutaric acid, adipic acid (melting point: 151 to 153° C.), suberic acid, an Li salt of suberic acid, an Na salt of suberic acid, an Mg salt of suberic acid, a Ca salt of suberic acid, a Ba salt of suberic acid, sebacic acid, an Li salt of sebacic acid, an Na salt of sebacic acid, an Mg salt of sebacic acid, a Ca salt of sebacic acid, an Al salt of sebacic acid, diphenylphosphinic acid (melting point: 193 to 196° C.), an Li salt of diphenylphosphinic acid, an Na salt of diphenylphosphinic acid, a K salt of diphenylphosphinic acid, a Ca salt of diphenylphosphinic acid, an Mg salt of diphenylphosphinic acid, an Al salt of diphenylphosphinic acid, an Li salt of 4,4'-dichlorodiphenylphosphinic acid, an Na salt of 4,4'-dimethyldiphenylphosphinic acid, dinaphthylphosphinic acid, an Li salt of dinaphthylphosphinic acid, an Na salt of dinaphthylphosphinic acid, an Mg salt of dinaphthylphosphinic acid, a Ca salt of dinaphthylphosphinic acid, and an Al salt of dinaphthylphosphinic acid.

<Phenol Compound for Imparting Anti-Oxidant Properties Other than the Phenol Compound of the Present Invention>

Phenol compounds for imparting anti-oxidant properties such as 2-t-butyl-6-(3-t-butyl-2-hydroxy-5-methylbenzyl)-4-methylphenyl acrylate (melting point: not lower than 130° C.), 2-[1-(2-hydroxy-3,5-di-t-pentylphenyl)ethyl]-4,6-di-t-pentylphenyl acrylate (melting point: 119° C.), 1,3,5-trimethyl-2,4,6-tris(3,5-di-t-butyl-4-hydroxybenzyl)benzene (melting point: 240 to 245° C.), tris(3,5-di-t-butyl-4-hydroxybenzyl)isocyanurate (melting point: 218 to 223° C.), 1,3,5-tris(4-t-butyl-3-hydroxy-2,6-dimethylbenzyl)-1,3,5-triazine-2,4,6-(1H,3H,5H)-trion (melting point: 159 to 162° C.), 2,2'-methylenebis(6-t-butyl-4-methylphenol) (melting point: not lower than 128° C.), 4,4'-butylidenebis(6-t-butyl-3-methylphenol) (melting point: not lower than 209° C.), 4,4'-thiobis(6-t-butyl-3-methylphenol) (melting point: not lower than 160° C.), n-octadecyl-3-(4-hydroxy-3,5-di-t-butylphenyl)propionate (melting point: 50 to 55° C.), 2,6-di-t-butyl-4-methylphenol (melting point: 69° C. (freezing point)), and 2,2-thio-diethylene-bis[3-(3,5-di-t-butyl-4-hydroxyphenyl)propionate] (melting point: not lower than 63° C.)

When a granular composition is produced according to the production method of the invention, as described above, first, the mixture containing not less than 3 parts by weight and not more than 80 parts by weight of the phenol compound and not less than 20 parts by weight and not more than 50 parts by weight of the binder is stirred and granulated.

As a stirring granulator used in the stirring granulation step, there can be usually mentioned an internal stirring type granulator having a stirring blade in a stirring tank and having a clearance of usually 30 mm or less, preferably not less than 0.1 mm and not more than 5 mm, being provided between the stirring blade and the inside wall surface of the stirring tank.

Examples of the typical stirring granulators include vertical mixers such as a high-speed mixer (stirring and tumbling granulator), a Henschel mixer (high-speed stirring granulator), a vertical granulator, Pharma Matrix, Super Mixer, GRAL, Schugi mixer, High speeder, and New Speed Kneader; and horizontal mixers such as a Loedige mixer, Spartan Granulator, and Pin Mixer. The high-speed mixer may be preferably exemplified.

The shape of the stirring blade tip in the stirring tank of the stirring granulator may be suitably designed, and, for example, a shape in which the blade inclines (at an angle of inclination of 10° to 50°, for example) toward the central portion of a high-speed mixer, so that the mixture is scooped up to the central portion and does not remain in corners between the bottom part and the wall surface, may be preferably exemplified.

The tip speed of the stirring blade in the stirring tank of the stirring granulator depends on the shape, but it is, for example, not lower than 2 m/second and not higher than 40 m/second, preferably not lower than 4 m/second and not higher than 10 m/second. When the stirring granulator has a chopper on the wall of the stirring tank, the blade tip speed of the chopper depends on the shape, but it is, for example, not lower than 2 m/second and not higher than 40 m/second, preferably not lower than 5 m/second and not higher than 30 m/second.

The volume of the starting materials for providing the mixture containing the phenol compound and the binder, which is to be supplied into the stirring tank equipped in the stirring granulator, can be suitably changed. When a high-speed mixer is used, for example, the volume may be set so as to occupy not less than 30% and not more than 60% of the total volume of the stirring tank.

When the starting materials for providing the mixture containing the phenol compound and the binder are added to the inside of the stirring tank equipped in the stirring granulator, the starting materials for the mixture containing the phenol compound and the binder are previously mixed in a mixing machine such as a mixer or a blender to give a mixture, and then the resulting mixture may be added to the stirring granulator; however, it is preferable to add simultaneously or sequentially the starting materials to the stirring granulator.

When the mixture containing the phenol compound and the binder is stirred and granulated, the temperature of the mixture may be set within a range of, for example, a temperature equal to or higher than the temperature which is 10° C. lower than the melting point of the binder and equal to or lower than the temperature which is 20° C. higher than the melting point of the binder, preferably within a range of a temperature equal to or higher than the temperature which is 10° C. lower than the melting point of the binder and equal to or lower than the temperature which is 10° C. higher than the melting point of the binder. The temperature may be set by utilizing, for example, a heating means equipped in the stirring granulator, specifically, for example, by passing a heat medium through the jacket of the stirring granulator, thereby elevating the temperature.

The production method of the invention includes a step in which a granular agglomerate, which is obtained by stirring and granulating the mixture containing the phenol compound and the binder, is cracked at a temperature equal to or lower than the melting point of the binder and equal to or higher than the temperature which is 10° C. lower than the melting point, through a cracking machine equipped with a separation mechanism capable of recovering a granule with a particle size of not more than 5 mm and a cracking mechanism to give a granule.

Any separation mechanism can be used in the cracking machine, so long as it can recover a granule having a particle size of not more than 5 mm. Examples of the typical separation mechanism include screens having openings capable of recovering a granule having the desired particle size. As used herein, the term "equip" means not only (1) an aspect in which the separation mechanism exists being integrally incorporated in the main body of the cracking machine, so that the step where the granule is separated from the granular agglomerate through the separation mechanism proceeds simultaneously with or successively with the step where the granular agglomerate is cracked through the cracking mechanism included in the cracking machine, but also (2) an aspect in which the separation mechanism exists being additionally attached to the cracking machine outside the main body, so that the step where the granular agglomerate is cracked through the cracking mechanism included in the cracking machine proceeds, and then the step where the granule is separated from the granular agglomerate through the separation mechanism follows discontinuously.

The term "opening" means a hole or an aperture (an area through which the granule passes) in the screen.

The size of the "hole or aperture" is, for example, from about 2 to 5 mm.

Examples of the cracking mechanism equipped in the cracking machine include a contact-type shearing mechanism capable of cracking a granular agglomerate into a granule through a reciprocating or revolving plate.

The temperature at which the granular agglomerate is cracked through such a cracking machine is set within the range of a temperature equal to or lower than the melting point of the binder and equal to or higher than the temperature which is 10° C. lower than the melting point of the binder. The temperature described above may be set by utilizing, for example, a heating or cooling means included in the cracking machine, and the specific method for controlling the temperature may be a method in which a heat medium is passed through a jacket of the cracking machine.

Examples of the cracking machine (which may also be generally called a disintegrator, a grinder, or the like), which may be used in the production method of the invention, include an oscillator (manufactured by Fukae Powtec.), Flake Crusher (manufactured by Hosokawa Micron), a disintegrator (manufactured by Hosokawa Micron), Power Mill (manufactured by Fuji Paudal Co., Ltd.), Quick Mill (manufactured by Seishin Enterprise Co., Ltd.), Feather Mill (manufactured by Hosokawa Micron), a cutter mill (manufactured by Makino MFG. Co., Ltd., Masuko Sangyo Co., Ltd., or Sansho Industry Co., Ltd.), and Bexmill (manufactured by Hosokawa Micron). The oscillator and Flake Crusher may be preferably exemplified.

The oscillator is explained in more detail as a typical cracking machine. The oscillator used in examples of the present invention (specifically, in order to obtain the desired granule size described above) includes a rotor and a screen, and has a clearance with a width usually not more than 10 mm, preferably about not less than 1 mm and not more than 5 mm between the rotor and the screen. The granular agglomerate is cracked by reciprocating the rotor to give a granule. The rotor reciprocates at a tip speed of, for example, not lower than 0.1 m/second and not higher than 1 m/second, and not less than 30 complete strokes/minute and not more than 300 complete strokes/minute.

The thus obtained granule has a particle size of substantially not more than 5 mm and may be used as a product as it is. When the granule is processed into a product including only the particles having the desired particle size described above with high precision, a step in which the fine powder contained in the obtained granule is removed through, for example, a sieve with an aperture of about 0.1 mm to 2 mm, may be added, if necessary.

The removed fine powder may be reused as a starting material for the production method of the invention.

The granular composition produced according to the production method of the invention is admixed with, for example, a resin such as a polyolefin. The mixing ratio of the granular composition of the invention to the resin may be, for example, not less than 5 parts by weight of the granular composition based on 100 parts by weight of the resin. It is specifically not less than 0.005 part by weight and not more than 5 parts by weight, preferably not less than 0.01 part by weight and not more than 2 parts by weight, more preferably not less than 0.01 part by weight and not more than 1 part by weight, and the like.

In a resin composition containing the granular composition of the invention and a resin, the resin is preferably a thermoplastic resin.

Any commercial available resin may be used as the thermoplastic resin without any particular limitation. Examples of the thermoplastic resin include polypropylene resins such as an ethylene-propylene copolymer, polyethylene resins (a high density polyethylene (HD-PE), a low density polyethylene (LD-PE), a linear low density polyethylene (LLDPE), and the like), a methylpentene polymer, an ethylene-ethyl acrylate copolymer, an ethylene-vinyl acetate copolymer, polystyrenes (polystyrenes such as poly(p-methylstyrene) and poly(α-methylstyrene)), an acrylonitrile-styrene copolymer, an acrylonitrile-butadiene-styrene copolymer, a special acrylic rubber-acrylonitrile-styrene copolymer, an acrylonitrile-chlorinated polyethylene-styrene copolymer, a styrene-butadiene copolymer, and the like), a chlorinated polyethylene, a polychloroprene, a chlorinated rubber, a polyvinyl chloride, a polyvinylidene chloride, a methacrylic resin, an ethylene-vinyl alcohol copolymer, a fluororesin, a polyacetal, a grafted polyphenylene ether resin, a polyphenylene sulfide resin, a polyurethane, a polyamide, polyester resins (for example, a polyethylene terephthalate, a polybutylene terephthalate, and the like), a polycarbonate, a polyacrylate, a polysulfone, a polyether ether ketone, polyether sulfone, an aromatic polyester resin, a diallyl phtharate prepolymer, a silicone resin, 1,2-polybutadiene, polyisoprene, a butadiene/acrylonitrile copolymer, an ethylene-methyl methacrylate copolymer, and the like. A polyethylene resin, a polypropylene resin and a polystyrene are preferable because of their good molding processability.

As used herein, the polypropylene resin refers to a polyolefin containing a structural unit derived from propylene, and specific examples thereof include a crystalline propylene homopolymer, a propylene-ethylene random copolymer, a propylene-α-olefin random copolymer, a propylene-ethylene-α-olefin terpolymer, and a polypropylene block copolymer containing a copolymer component composed of a propylene homopolymer component or mainly propylene and a copolymer component composed of propylene and ethylene and/or α-olefin.

In the present invention, when a polypropylene resin is used as the thermoplastic resin, the polypropylene resin may be used alone, or as a blend of the two kinds or more.

Examples of the α-olefin include α-olefins having 4 to 12 carbon atoms, such as 1-butene, 1-pentene, 1-hexene, 4-methyl-1-pentene, 1-octene, and 1-decene. Preferably, 1-butene, 1-hexene, and 1-octene are exemplified.

Examples of the propylene-α-olefin random copolymer include a propylene-1-butene random copolymer, a propylene-1-hexene random copolymer, and a propylene-1-octene random copolymer.

Examples of the propylene-ethylene-α-olefin terpolymer include a propylene-ethylene-1-butene terpolymer, a propylene-ethylene-1-hexene terpolymer, and a propylene-ethylene-1-octene terpolymers.

In the polypropylene block copolymer containing the copolymer component composed of a propylene homopolymer component or mainly propylene and the copolymer component composed of propylene and ethylene and/or α-olefin, examples of the copolymer component composed of mainly propylene include a propylene-ethylene copolymer component, a propylene-1-butene copolymer component, and a propylene-1-hexene copolymer component; and examples of the copolymer component composed of propylene and ethylene and/or α-olefin include a propylene-ethylene copolymer component, a propylene-ethylene-1-butene terpolymer component, a propylene-ethylene-1-hexene terpolymer component, a propylene-ethylene-1-octene terpolymer component, a propylene-1-butene copolymer component, a propylene-1-hexene copolymer component, and a propylene-1-octene copolymer component. The content of the ethylene and/or α-olefin having 4 to 12 carbon atoms in the copolymer component composed of propylene and ethylene and/or α-olefin is usually from 0.01 to 20% by weight.

Examples of the polypropylene block copolymer containing the copolymer component composed of a propylene homopolymer or mainly propylene and the copolymer component composed of propylene and ethylene and/or α-olefin include a propylene-ethylene block copolymer, a (propylene)-(propylene-ethylene) block copolymer, a (propylene)-(propylene-ethylene-1-butene) block copolymer, a (propylene)-(propylene-ethylene-1-hexene) block copolymer, a (propylene)-(propylene-1-butene) block copolymer, a (propylene)-(propylene-1-hexene) block copolymer, a (propylene-ethylene)-(propylene-ethylene-1-butene) block copolymer, a (propylene-ethylene)-(propylene-ethylene-1-hexene) block copolymer, a (propylene-ethylene)-(propylene-1-butene) block copolymer, a (propylene-ethylene)-(propylene-1-hexene) block copolymer, a (propylene-1-butene)-(propylene-ethylene) block copolymer, a (propylene-1-butene)-(propylene-ethylene-1-butene) block copolymer, a (propylene-1-butene)-(propylene-ethylene-1-hexene) block copolymer, a (propylene-1-butene)-(propylene-1-butene) block copolymer, and a (propylene-1-butene)-(propylene-1-hexene) block copolymer.

In the present invention, when a polypropylene resin is used as the thermoplastic resin, a crystalline propylene homopolymer and the polypropylene block copolymer containing the copolymer component composed of a propylene homopolymer component or mainly propylene and the copolymer component composed of propylene and ethylene and/or α-olefin having 4 to 12 carbon atoms are preferably used, and the polypropylene block copolymer containing the copolymer component composed of a propylene homopolymer or mainly propylene and the copolymer component composed of propylene and ethylene and/or α-olefin having 4 to 12 carbon atoms is more preferably used.

FIG. 1 demonstrates as one embodiment, a device which can be used in the step of stirring and granulating of a mixture of the present invention.

Figure 2:
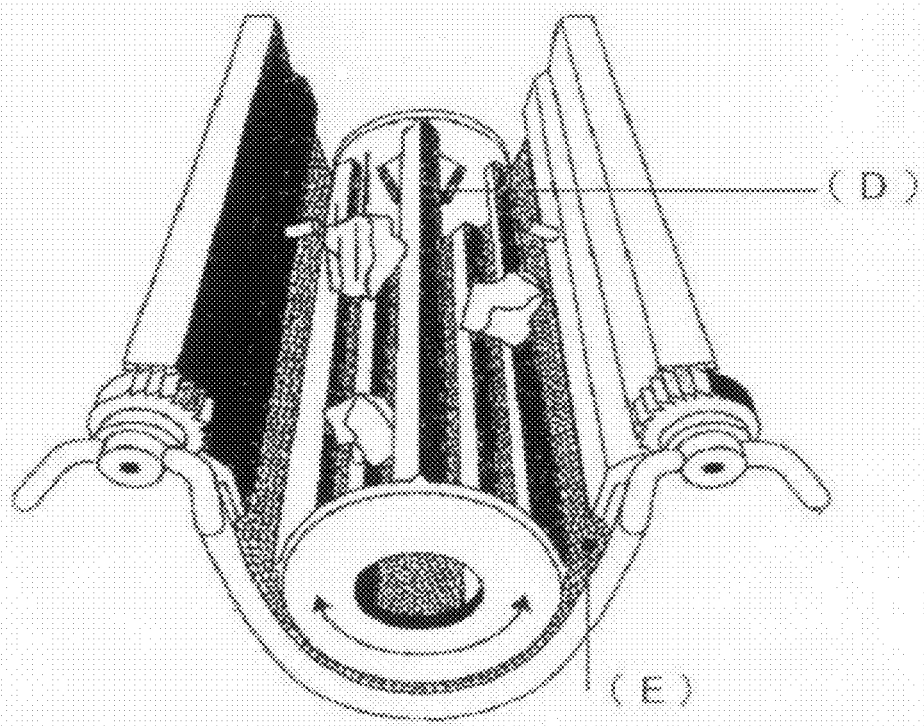
FIG. 2 is a schematic view of a cracking machine used in examples and comparative examples.

FIG. 2 demonstrates as one embodiment, a device which can be used in the step of cracking a granular agglomerate in the present invention.

EXAMPLES

The present invention is explained in more detail by means of the following examples and comparative examples.
<Material>

In examples, the following starting materials were used.
Component A (phenol anti-oxidant (1)): 3,9-bis[2-{3-(3-t-butyl-4-hydroxy-5-methylphenyl)propionyloxy}-1,1-dimethylethyl]-2,4,8,10-tetraoxaspiro[5.5]undecane "Sumilizer GA-80®" "(manufactured by Sumitomo Chemical Co., Ltd.)
Component B (binder): di-n-tetradecyl 3,3'-thiodipropionate "Sumilizer TPM®" (manufactured by Sumitomo Chemical Co., Ltd.) (melting point: 51° C.)
Component C: calcium stearate (manufactured by Shinagawa Chemical Industry Co., Ltd.)
Component D: tris(2,4-di-t-butylphenyl)phosphite "Irgafos 168®" (manufactured by BASF)
Component E: sodium benzoate
Component F: talc fine powder "Micron White 5000S®" (manufactured by Hayashi Kasei Co., Ltd.)
Component G: hydrotalcite "DHT-4C" (manufactured by Kyowa Chemical Industry Co., Ltd.)

Example 1

To a 100 L-volume high-speed mixer (Model FS-100 manufactured by Fukae Powtec.) were added starting materials (total weight: 15 kg) containing 1.3 kg (8.9 parts by weight) of Component A, 4.0 kg (26.8 parts by weight) of Component B, 35.7 parts by weight of Component D, 25.0 parts by weight of Component E and 3.6 parts by weight of Component G.

Warm water having a temperature of 50° C. was passed through a jacket of the high-speed mixer, thereby heating a stirring tank equipped in the high-speed mixer, then the number of revolution of stirring blades equipped in the inside of the stirring tank of the high-speed mixer was set at 165 rpm (a blade tip speed of 6 m/second), and the number of revolution of a chopper was set at 1500 rpm (a blade tip speed of 10 m/second), and after that the high-speed mixer was run for about 20 minutes under the conditions described above.

In this way, 13.8 kg of a granular agglomerate (the temperature of the granular agglomerate was 41° C. at the end of the stirring granulation) was obtained by stirring and granulating the mixture containing the starting materials described above.

The thus obtained granular agglomerate was added to an oscillator (Model MF-3 manufactured by Fukae Powtec.) equipped with a screen with 4 mm openings, while the temperature was kept at almost the same temperature as described above.

After it was confirmed that the clearance between a rotor and the screen in the oscillator was not less than 1 mm and not more than 5 mm, the temperature of the rotor was elevated, then the reciprocating speed of the rotor was set at a tip speed of 0.37 m/second and 110 complete strokes/minute while the temperature was kept at almost the same temperature as above (about 41° C.), and after that the oscillator was run for about 1 minute and 40 seconds under the conditions described above.

In this way, the granular agglomerate was cracked through the oscillator to give a granule (particle size: not more than 4 mm, yield: 100%, processing capacity: 8.3 kg/minute).

The yield was calculated as follows:

Yield=(weight of granule obtained by cracking through oscillator)/(weight of granular agglomerate added to oscillator)×100.

The processing capacity was calculated as follows:

Processing Capacity=(weight of granular agglomerate added to oscillator)/(time required for processing).

Various production units were not damaged or broken (specifically, deformation of the screen or the reciprocating or revolving plates in the oscillator) by the impact and contact load due to the granular agglomerate, thus resulting in unnecessariness of repair and replacement of the production units, which consequently led to improvement of the productivity.

Example 2

Starting materials (total weight: 15 kg) containing 1.6 kg (10.7 parts by weight) of Component A, 4.1 kg (27.7 parts by weight) of Component B, 18.3 parts by weight of Component C, 39.7 parts by weight of Component D and 3.7 parts by weight of Component F were added to a high-speed mixer.

Warm water having a temperature of 50° C. was passed through a jacket of the high-speed mixer, thereby heating a stirring tank equipped in the high-speed mixer, then the number of revolution of stirring blades equipped in the inside of the stirring tank of the high-speed mixer was set at 165 rpm (a blade tip speed of 6 m/second), and the number of revolution of a chopper was set at 1500 rpm (a blade tip speed of 10 m/second), and after that the high-speed mixer was run for about 1 minute and 20 seconds under the conditions described above.

In this way, 12.9 kg of a granular agglomerate (the temperature of the granular agglomerate was 41° C. at the end of the stirring granulation) was obtained by stirring and granulating the mixture containing the starting materials described above.

The thus obtained granular agglomerate was added to an oscillator (Model MF-3 manufactured by Fukae Powtec.) equipped with a screen with 4 mm openings, while the temperature was kept at about 40° C.

After it was confirmed that the clearance between a rotor and the screen in the oscillator was not less than 1 mm and not more than 5 mm, the temperature of the rotor was elevated, then the reciprocating speed of the rotor was set at a tip speed of 0.37 m/second and 110 complete strokes/minute while the product temperature was kept at the same temperature as above, and after that the oscillator was run for about 1 minute and 20 seconds under the conditions described above.

In this way, the granular agglomerate was cracked through the oscillator to give a granule (granule size: not more than 4 mm, yield: 98.5%, processing capacity: 9.7 kg/minute).

Various production units were not damaged or broken (specifically, deformation of the screen or the reciprocating or revolving plates in the oscillator) by the impact and contact load due to the granular agglomerate, thus resulting in unnecessariness of repair and replacement of the production units, which consequently led to improvement of the productivity.

Example 3

To a 2500 L-volume high-speed mixer (Model FS-GC-2500) manufactured by Fukae Powtec.) were added starting materials (total weight: 336 kg) containing 30 kg (8.8 parts by weight) of Component A, 90 kg (26.9 parts by weight) of Component B, 35.8 parts by weight of Component D, 24.9 parts by weight of Component E and 3.6 parts by weight of Component G.

Warm water having a temperature of 50° C. was passed through a jacket of the high-speed mixer, thereby heating a stirring tank equipped in the high-speed mixer, then the number of revolution of stirring blades equipped in the inside of the stirring tank of the high-speed mixer was set at 61 rpm (a blade tip speed of 6 m/second), and the number of revolution of a chopper was set at 1500 rpm (a blade tip speed of 24 m/second), and after that the high-speed mixer was run for about 50 minutes under the conditions described above.

In this way, 333 kg of a granular agglomerate (the temperature of the product was 48° C. at the end of the stirring granulation) was obtained by stirring and granulating the mixture containing the starting materials described above.

The thus obtained granular agglomerate was added to an oscillator (Model MF-6 manufactured by Fukae Powtec.) equipped with a screen with 4 mm openings, while the product temperature was kept at the same temperature as above.

After it was confirmed that the clearance between a rotor and the screen in the oscillator was not less than 1 mm and not more than 5 mm, the temperature of the rotor was elevated, then the reciprocating speed of the rotor was set at a tip speed of 0.37 m/second and 110 complete strokes/minute while the product temperature was kept at the same temperature as above, and after that the oscillator was run for about 40 minutes under the conditions described above.

In this way, the granular agglomerate was cracked through the oscillator to give a granule (granule size: not more than 4 mm, yield: 99.4%, processing capacity: 8.3 kg/minute).

Various production units were not damaged or broken (specifically, deformation of the screen or the reciprocating or revolving plates in the oscillator) by the impact and contact load due to the granular agglomerate, thus resulting in unnecessariness of repair and replacement of the production units, which consequently led to improvement of the productivity.

Comparative Example 1

To a 100 L-volume high-speed mixer (Model FS-100 manufactured by Fukae Powtec.) were added starting materials (total weight: 15 kg) containing 1.3 kg (8.9 parts by weight) of Component A, 4.0 kg (26.8 parts by weight) of Component B, 37.5 parts by weight of Component D, 25.0 parts by weight of Component E and 3.6 parts by weight of Component G.

Warm water having a temperature of 50° C. was passed through a jacket of the high-speed mixer, thereby heating a stirring tank equipped in the high-speed mixer, then the number of revolution of a stirring blades equipped in the inside of the stirring tank of the high-speed mixer was set at 165 rpm (a blade tip speed of 6 m/second), and the number of revolution of a chopper was set at 1500 rpm (a blade tip speed of 10 m/second), and after that the high-speed mixer was run for about 20 minutes under the conditions described above.

In this way, 13.6 kg of a granular agglomerate (the temperature of the product was 42° C. at the end of the stirring granulation) was obtained by stirring and granulating the mixture containing the starting materials described above.

The thus obtained granular agglomerate was allowed to stand to cool to room temperature (30° C.). After cooling, the agglomerate was added to an oscillator (Model MF-3 manufactured by Fukae Powtec.) equipped with a screen with 4 mm openings.

After it was confirmed that the clearance between a rotor and the screen in the oscillator was not less than 1 mm and not more than 5 mm, the reciprocating speed of the rotor was set at a tip speed of 0.37 m/second and 110 strokes/minute while the product temperature was kept at the same temperature as above or lower, without elevating the temperature of the rotor, and after that the oscillator was run under the conditions described above. The processing took 3 minutes.

In this way, the granular agglomerate was cracked through the oscillator to give a granule (granule size: not more than 4 mm), but there were many granular agglomerates which had not been cracked or regenerated from the obtained granule by agglomeration. Although the yield was 99.5%, the processing capacity was low, i.e., 4.5 kg/minute.

Various production units were damaged or broken (specifically, deformation of the screen or the reciprocating or revolving plates in the oscillator) by the impact and contact load due to the granular agglomerate, thus resulting in necessity of repair and replacement of the production units, which consequently led to decrease of the productivity.

Comparative Example 2

A granular agglomerate obtained in the same manner as in Example 1 was heated to 55° C., and was added to an oscillator, while the temperature was kept at that temperature. The oscillator was run in the same manner as in Example 1 except that the temperature was kept at the same temperature as above. Component B, the binder, melted, and bigger agglomerates were generated in the oscillator, and consequently, no granule was recovered.

The desired granule can be obtained according to the present invention. In addition, secondary effects that damages and breakages of various production units, which are caused by the impact and contact load due to the granular agglomerate when the granular composition is produced by stirring granulation, can be reduced, thus resulting in unnecessariness of repair and replacement of the production units; as a result, the improvement of the productivity can be realized.

What is claimed is:

1. A method for producing a granular composition comprising the steps of:

stirring and granulating a mixture containing not less than 3 parts by weight and not more than 80 parts by weight of a phenol compound represented by the formula (1):

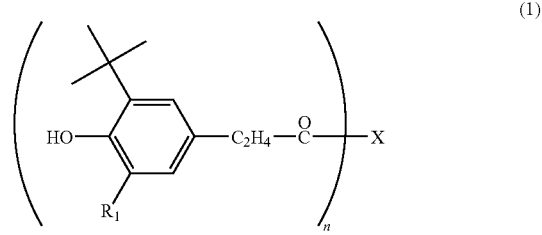

(1)

wherein $R_1$ is an alkyl group having 1 to 8 carbon atoms, X is an n-valent alcohol residue having 1 to 18 carbon atoms optionally containing a heteroatom, a cyclic group, or a heteroatom and a cyclic group, and n is an integer of 1 to 4, and not less than 20 parts by weight and not more than 50 parts by weight of a binder to obtain a granular agglomerate; and cracking the granular agglomerate at a temperature equal to or lower than the melting point of the binder and equal to or higher than the temperature which is 10° C. lower than the melting point, through a cracking machine equipped with a separation mechanism capable of recovering a granule having a particle size of not more than 5 mm, and a cracking mechanism, to obtain a granule.

2. The method according to claim 1, wherein the binder has a melting point of not lower than 40° C. and not higher than 90° C.

3. The method according to claim 1, wherein the separation mechanism is a screen having an opening.

4. The method according to claim 1, wherein the cracking mechanism is a contact-type shearing mechanism capable of cracking the granular agglomerate into the granule through a reciprocating or revolving plate.

5. The method according to claim 1, wherein the phenol compound is at least one compound selected from the group consisting of 3,9-bis[2-{3-(3-t-butyl-4-hydroxy-5-methylphenyl)propionyloxy}-1,1-dimethylethyl]-2,4,8,10-tetraoxaspiro[5.5]undecane, pentaerythrityl tetrakis[3-(3,5-di-t-butyl-4-hydroxyphenyl)propionate], and triethylene glycolyl bis{3-(3-t-butyl-4-hydroxy-5-methylphenyl)propionate}.

6. The method according to claim 1, wherein the binder is a sulfur compound represented by the formula (2):

$$(R_2-Y-S-C_2H_4CO)_m-Z \qquad (2)$$

wherein $R_2$ is an alkyl group having 12 to 18 carbon atoms, Y is a single bond or $-C_2H_4CO_2-$, m is an integer of 1 to 4, and Z is an m-valent alcohol residue having 5 to 18 carbon atoms.

7. The method according to claim 1, wherein the binder is at least one compound selected from the group consisting of di-n-dodecyl 3,3'-thiodipropionate, di-n-tetradecyl 3,3'-thiodipropionate, and di-n-octadecyl 3,3'-thiodipropionate.

* * * * *